(12) United States Patent
Goker et al.

(10) Patent No.: US 7,477,474 B2
(45) Date of Patent: Jan. 13, 2009

(54) SERVO WRITING AND DECODING POSITION ERROR SIGNAL FOR LINEAR TAPE DRIVES

(75) Inventors: Turguy Goker, Solana Beach, CA (US); Ming-chih Weng, Los Angeles, CA (US); Jerry Hodges, Riverside, CA (US)

(73) Assignee: Quantum Corporation, San Jose, CA (US)

(*) Notice: Subject to any disclaimer, the term of this patent is extended or adjusted under 35 U.S.C. 154(b) by 0 days.

(21) Appl. No.: 11/692,723

(22) Filed: Mar. 28, 2007

(65) Prior Publication Data

US 2008/0239559 A1  Oct. 2, 2008

(51) Int. Cl.
*G11B 5/584* (2006.01)

(52) U.S. Cl. .................................. 360/77.12

(58) Field of Classification Search .............. 360/77.12, 360/48, 72.1, 40, 70; 386/103, 108; 250/559.36
See application file for complete search history.

(56) References Cited

U.S. PATENT DOCUMENTS

| | | | |
|---|---|---|---|
| 3,651,276 A * | 3/1972 | Clark | 360/70 |
| 5,294,803 A * | 3/1994 | Pahr | 250/559.36 |
| 5,689,384 A | 11/1997 | Albrecht | |
| 5,930,065 A | 7/1999 | Albrecht | |
| 5,963,400 A | 10/1999 | Cates et al. | |
| 6,031,671 A * | 2/2000 | Ayres | 360/40 |
| 6,236,525 B1 | 5/2001 | Cates et al. | |
| 6,339,676 B1 * | 1/2002 | Amada et al. | 386/108 |
| 6,710,967 B2 | 3/2004 | Hennecken | |
| 6,842,305 B2 | 1/2005 | Molstad | |
| 6,879,457 B2 | 4/2005 | Eaton | |
| 6,952,317 B2 * | 10/2005 | Molstad et al. | 360/48 |
| 6,961,200 B2 * | 11/2005 | Lee et al. | 360/72.1 |
| 6,989,960 B2 | 1/2006 | Dugas | |
| 7,110,210 B2 * | 9/2006 | Saliba et al. | 360/77.12 |
| 7,158,338 B2 | 1/2007 | Koski | |
| 2002/0102096 A1 * | 8/2002 | Amada et al. | 386/103 |
| 2005/0030661 A1 | 2/2005 | Bui et al. | |
| 2006/0066977 A1 | 3/2006 | Tada | |

* cited by examiner

*Primary Examiner*—Fred Tzeng
(74) *Attorney, Agent, or Firm*—Baker Botts L.L.P.

(57) ABSTRACT

The present invention, in particular embodiments, is directed to methods, apparatuses and systems that facilitate recording of servo signals on a recording medium such as magnetic tape with high accuracy. Variation of inter-frame and intra-frame placement is substantially reduced by writing successive frames or sub-frames based on a detection of a previously-written frame or sub-frame by a read element. Appropriate placement of the read element in relation to servo write elements, on a multi-gap servo write head, ensures the correct placement of subsequent frames on the recording medium.

28 Claims, 13 Drawing Sheets

SERVO WRITING AND DECODING POSITION ERROR SIGNAL FOR LINEAR TAPE DRIVES

TECHNICAL FIELD

The present invention relates generally to timing-based servos utilized in linear tape drive systems.

BACKGROUND

Linear tape drive systems provide for high-density recording on multiple tracks of a magnetic tape. In certain arrangements, parallel tracks extend along a longitudinal direction of the magnetic tape. During recording or playback, the read/write elements of the head should be aligned with the desired track as the tape moves in a longitudinal direction across the read/write bump. Closed loop positioners are often used in tape systems having higher track densities. In high-density tape systems, the tape may wander in the lateral direction as it moves in the longitudinal direction across a read/write head, which results in an offset between the read/write head and the track center line. To avoid these types of problems, tape cartridges for high-density tape drives are pre-formatted with information often called servo information, which is used to maintain the correct lateral position of the tape with respect to the read/write head. Servo information provides the system with feedback to determine the continuous position of the tape relative to the head. Analysis of the servo signals allows for a determination of an offset and the distance of the offset between the track and the head. Based on the information, the head is moved by a positioner to the center line of the track so that write/read operations can occur properly. Closed loop positioners generally use positioners to move the head during a write/read operation. These positioners are used to maintain the position of the head at the center line of the track under a closed loop servo control using the preformatted servo information on the tape.

Linear Tape Open ("LTO") is a computer storage magnetic tape format that employs a servo-based, closed loop control mechanism. The servos are arranged in a frame which are sets of stripes oriented in a pre-defined servo pattern. Successive frames are arranged longitudinally across a length of a tape. The LTO roadmap calls for successive increases in capacity and data transfer rate. As track densities increase with each new generation of LTO tape drives, the ability to precisely write servo pattern frames to a tape also needs to be improved.

SUMMARY

The present invention, in particular embodiments, is directed to methods, apparatuses and systems that facilitate recording of servo signals on a recording medium such as magnetic tape with high accuracy. Variation of inter-frame and intra-frame placement is substantially reduced by writing successive frames or sub-frames based on a detection of a previously-written frame or sub-frame by a read element. Appropriate placement of the read element in relation to servo write elements, on a multi-gap servo write head, ensures the correct placement of subsequent frames on the recording medium.

The following embodiments and aspects thereof are described and illustrated in conjunction with systems, apparatuses and methods which are meant to be exemplary and illustrative, not limiting in scope. In various embodiments, one or more of the above-described problems have been reduced or eliminated. In addition to the aspects and embodiments described above, further aspects and embodiments will become apparent by reference to the drawings and by study of the following descriptions.

BRIEF DESCRIPTION OF THE DRAWINGS

Example embodiments are illustrated in referenced figures of the drawings. It is intended that the embodiments and figures disclosed herein are to be considered illustrative rather than limiting.

DETAILED DESCRIPTION

The following embodiments and aspects thereof are described and illustrated in conjunction with systems, apparatuses and methods which are meant to be illustrative, not limiting in scope.

Figure 1:
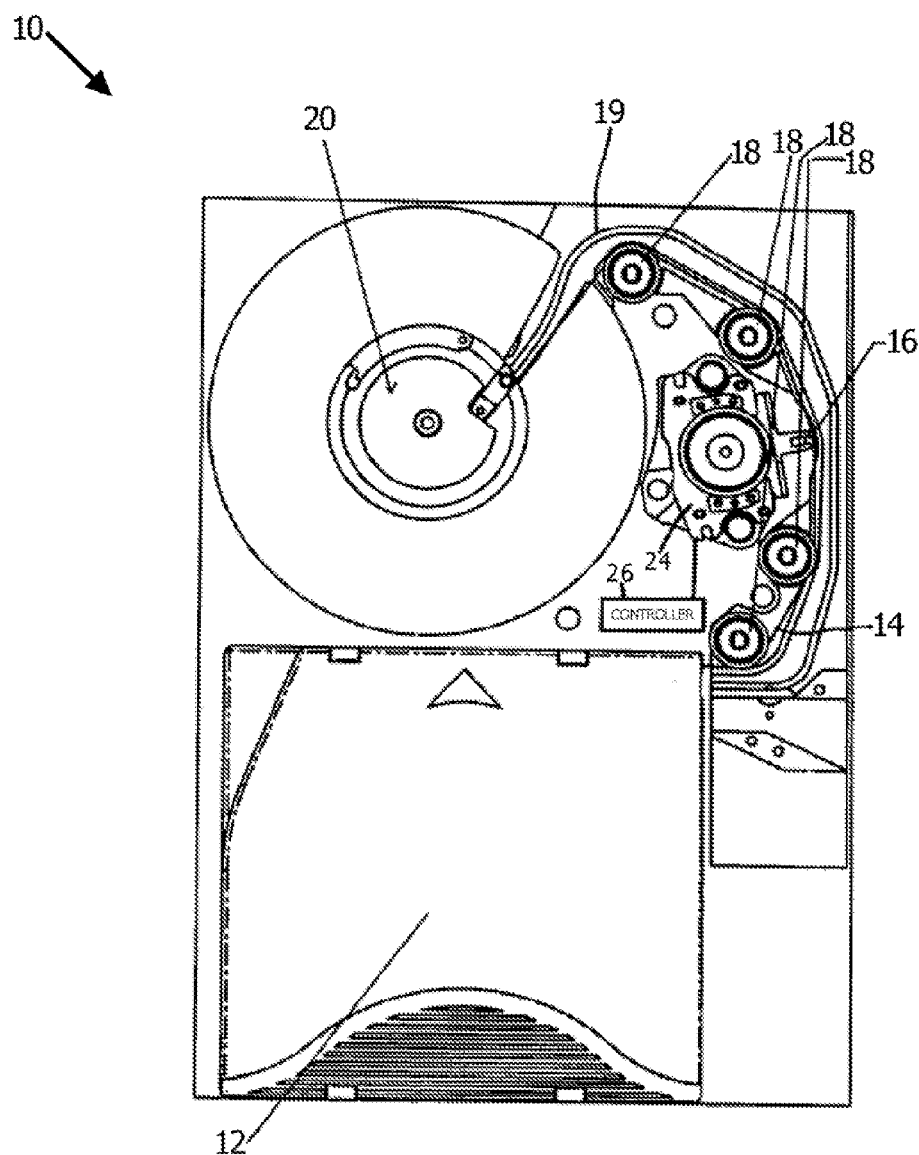
FIG. 1 illustrates a depiction of typical linear tape drive.

FIG. 1 shows an example embodiment of a tape drive 10. The figure shows the tape drive 10 in a normal plan view. Tape cartridge 12 is inserted into the tape drive 10. Tape 14 is depicted as threaded into the take-up hub assembly 20. Tape 14 is guided by tape guides 18 past the magnetic head 16. A guide track 19 is used to guide a tape leader between the tape cartridge 12 and the take-up hub assembly 20. A head positioning mechanism is schematically indicated as block 24 and coupled to the magnetic head 16. In response to control signals from a controller 26, the head positioning mechanism 24 adjusts the position of the magnetic head 16. The controller 26 generates these control signals in response to the detected servo stripes pre-recorded on the tape 14.

Figure 2:
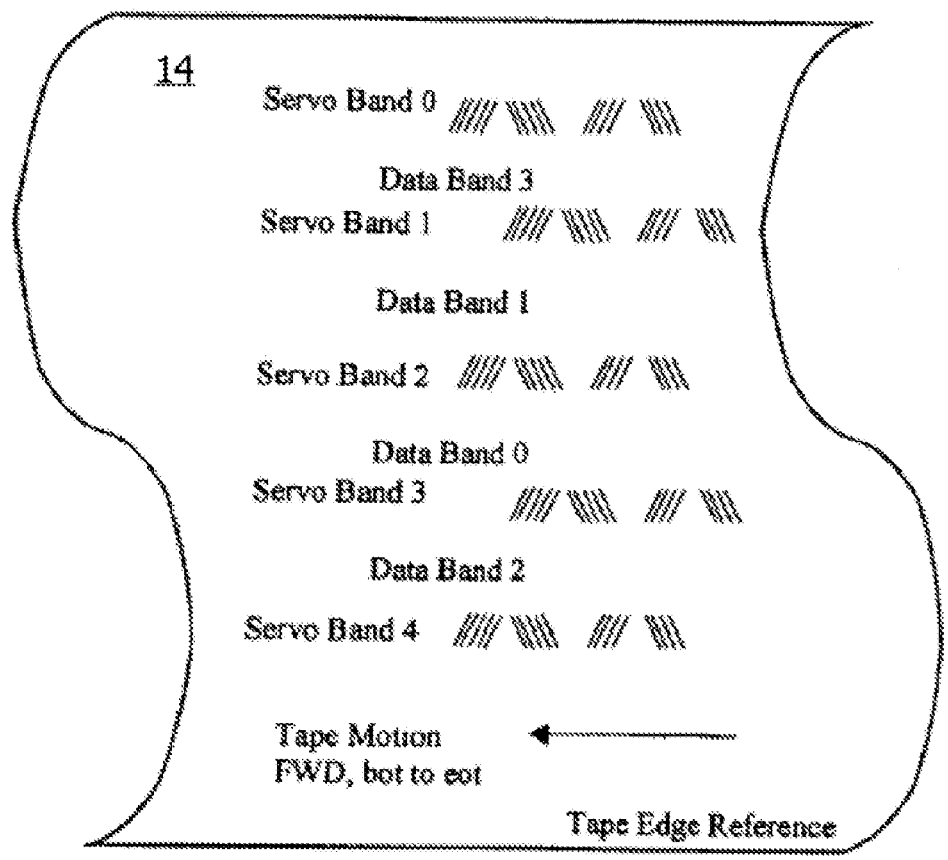
FIG. 2 is a schematic depiction of a LTO position error signal ("PES") format pre-recorded on a tape.

Referring to FIG. 2, an example LTO PES servo format is schematically depicted. There are five servo bands, 0-4, laterally spaced apart from one another. In between the servo bands are four data bands, 0-3. In the LTO format, the PES feedback is defined as the timing based servo system. The timing pulse is generated by the detection of the servo stripes and is decoded into ratios whereby the tracking algorithm formulates the PES. The labeling "bot" and "eot" on FIG. 2 refers to "beginning of tape" and "end of tape" respectively. Of course, the servo bands can be arranged in other configurations relative to the data tracks or bands.

Figure 3:
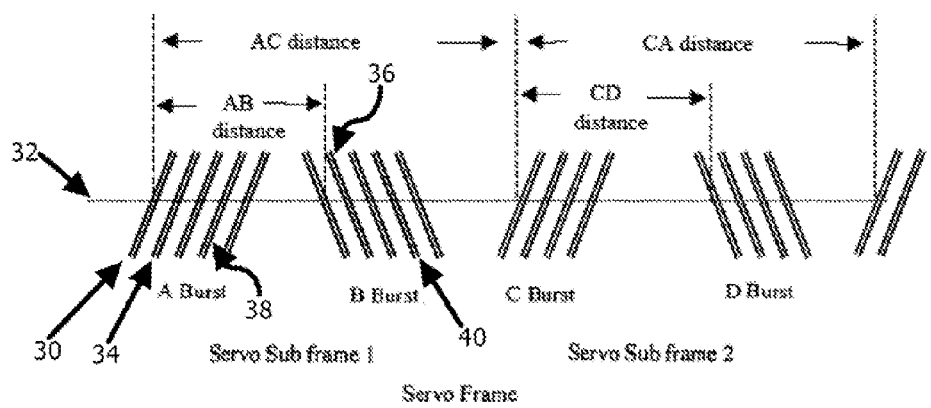
FIG. 3 is a detailed schematic depiction of a PES format of pre-recorded servo stripes on a pre-formatted tape.

Referring also now to FIG. 3, a servo stripe, such as servo stripe 30, comprises two magnetic transitions that, according to one tape format, are typically spaced 2.1 microns apart and angled six degrees from a vertical. As depicted in FIG. 3, multiple servo stripes are arranged into groups which will be referred to as servo bursts. There are four distinct types of servo bursts, A, B, C, and D. The A and B bursts both consist of five stripes, while the C and D bursts are four stripes each. A grouping of the A, B, C and D bursts refers to a frame while a grouping of the A and B bursts and a grouping of the C and D burst are referred to as sub-frames. Some other important dimensional considerations include that each servo stripe, within a burst, are separated by 5 microns. Additionally, distances AB and CD are preferably 50 microns at midpoint and distances AC and CA (C burst to the next A burst of the next frame) are 100 microns.

A detected ratio of AB to AC and CD to CA defines a PES signal. The servo read element of a read/write head, such as read/write head 16, reads a servo track on a tape which includes multiple servo frames in sequence such as the one shown in FIG. 3. As the servo frames are read, the controller 26 (refer to FIG. 1) calculates the PES. If the read/write head 16 is not aligned with centerline 32, the PES signal will indicate that and the controller 26 will adjust the read/write head accordingly.

The servo patterns can also be encoded with data and this is accomplished, typically, by adjusting second (34, 36) and fourth servo stripes (38, 40) in the A and B bursts by 0.25 microns. For example, if servo stripes 34 and 36 are shifted by 0.25 microns to the left and servo stripes 38 and 40 are shifted to the right by 0.25 microns then that combination is indicative of a ONE. Similarly, if servo stripes 34 and 36 are shifted to the right by 0.25 microns and servo stripes 38 and 40 are shifted by 0.25 microns to the left then that combination is indicative of a ZERO. By combining multiple frames, each encoded with a data bit (ONE or ZERO) a word can be formed. Encoding of data into a servo track in this manner is typically utilized to encode longitudinal tape position ("LPOS") wherein each encoded word is indicative of a position on the tape. By utilizing this encoded positional data, a controller 26 can move reel motors and locate specific locations on a tape.

Figure 4:
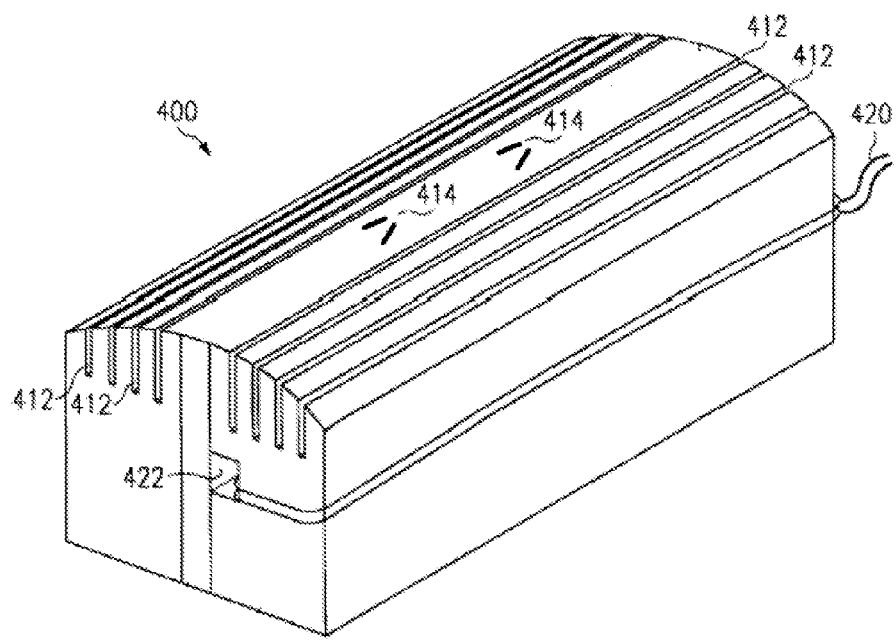
FIG. 4 is a perspective representation of a multi-gap head capable of writing servo tracks.

A typical read/write head, such as read/write head 16, used in tape drives typically are different from a head used to write servo tracks onto a tape. A head capable of doing this task is shown in FIG. 4 which is a perspective representation of a multi-gap servo write head 400. The multi-gap servo write head 400 includes gaps 414 that are patterned in a manner to produce servo stripes similar to the servo stripes illustrated in FIG. 3. The gaps 414 on the head 400 are all hooked into one magnetic core. Due to this, when the magnetic core is energized, gaps 414 are all simultaneously energized. The multi-gap servo write head 400 further includes a coil 420, for energizing the magnetic core, which connects to the magnetic core through a wiring slot 422. Also included are cross-slots 412 which promote air flow during operation. Gaps 414 are formed through photolithographic methods and the gaps 414 can therefore be very accurately defined and placed on the multi-gap servo write head 400. The gap/magnetic core combination can also be referred to as a servo write element. In some implementations that will be described in a subsequent sections, each pair of gaps can be energized independently by using separate magnetic cores and associated coils (not shown). Additionally, in some implementations, individual gaps of a pair of gaps can also be energized independently by using separate magnetic cores and associate coils (not shown).

Figure 5:
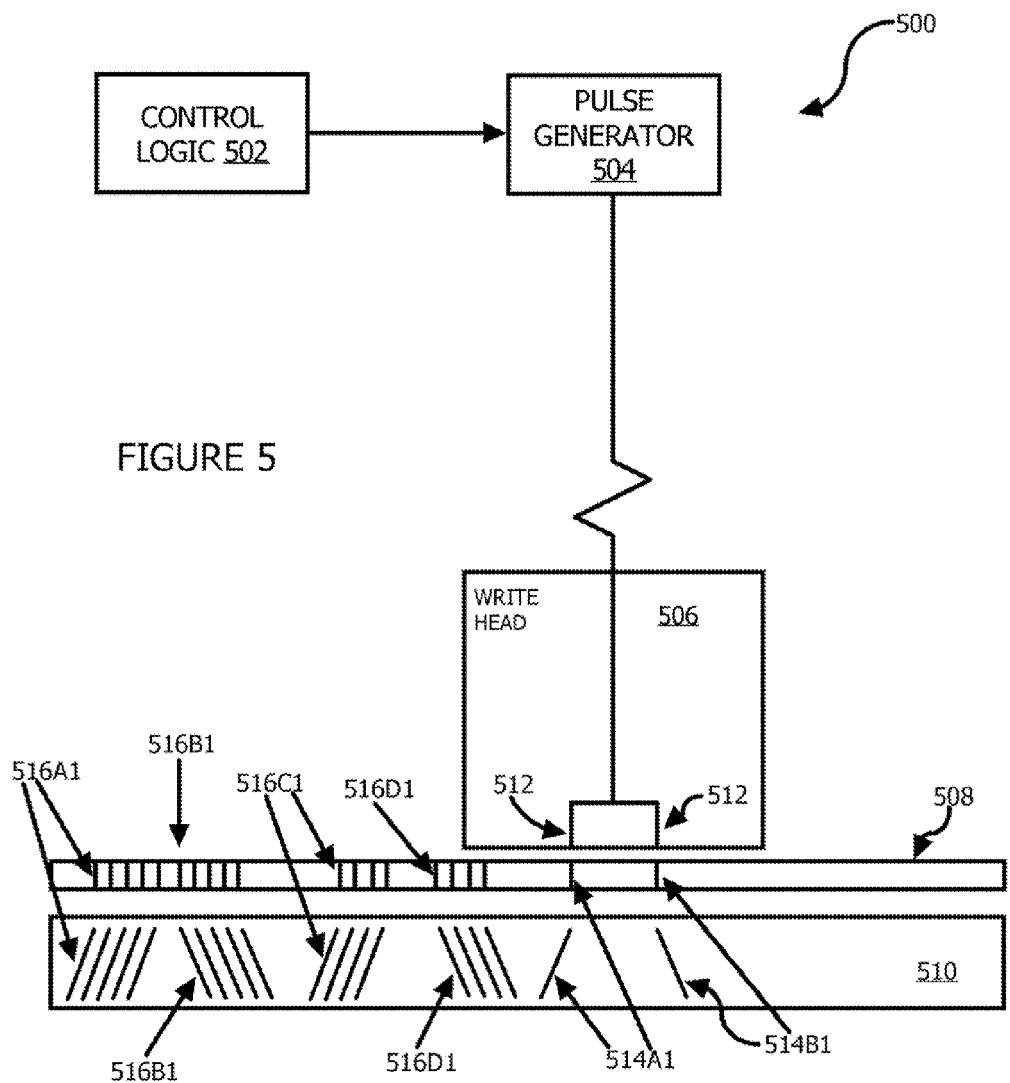
FIG. 5 is a block diagram illustrating how a servo pattern can be written to a tape.

FIG. 5 is a block diagram 500 illustrating how a servo pattern can be written to a tape. Included is control logic 502, a pulse generator 504, a write head 506, a top view 508 of a tape passing in front of the write head 506 and an elevation view 510 of the passing tape. Control logic 502 operably controls the operation of the pulse generator 504 which in turn energizes servo write elements 512. The servo write elements 512 have a shape that is similar to the shape of gaps 414 of FIG. 4. When servo write elements 512 are energized, servo stripes 514A1 and 51B8 are written to the tape as can be seen in views 508 and 510.

Servo stripes 514A1 and 51481 are first servo stripes of A and B bursts of a new servo frame. Servo stripes 516A1-516A5, 516B1-51685, 516C1-516C4 and 516D1-516D4 form a previously written servo frame. For simplicity, only a first servo stripe of the 516 A, B, C and D burst are labeled on FIG. 5. As the tape passes by the write head 506, control logic signals the pulse generator 504 to send timed pulses to the write head 506 to write the servo stripes 516. A first pulse writes first servo stripes 516A1 and 516B1 and a second pulse then writes servo stripes 516A2 and 516B2 at a spot on the tape displaced from the location of the 516A1 and 516B1 servo stripes due to the tape moving by. The pulse generator 504 then pulses 3 more times to finish the A and B bursts and then pulses four more times to write the C and D bursts.

It should be noted that block diagram 500 is not to scale. For example, view 508 of the top of the passing tape has an exaggerated width. Additionally, block diagram will also typically include an encoder to deliver LPOS data to control logic 502 to appropriately control pulse generator 504 to encode the desired data.

Typically, the pulse generator 504 is set up such that when it is activated by control logic 502, the pulse generator 504 will send a series of timed pulses to write one frame of a servo track or perhaps just a sub-frame. The control logic 502 will repeat this process for the next frame or sub-frame. This practice can introduce errors to the proper placement of the frames and sub-frames in relation to each other. For example, if a tape speed is traveling too fast, too slow or is varying, spacing between frames and/or sub-frames will not be correct or possibly vary. These errors, in turn, translate to misplacement of a read/write head, such as read/write head 16 of FIG. 1, in relation to a tape track due to a resulting erroneous PES signal.

The claimed embodiments advantageously reduce the problems associated with errors in written servo signals. In one particular implementation, this is accomplished by placing a read element in-line with servo write elements. The read element is precisely placed on a multi-gap servo write head in relation to servo write elements such that the read element will transduce recently-written servo stripes. Transducing the recently-written servo stripes serves as a signal to the control logic 502 to activate the pulse generator 504 to pulse for a new frame or, in some implementations, a sub-frame. By sensing the recently-written servo stripes, frame to frame and/or sub-frame to sub-frame placement variation of servo stripes can be dramatically decreased. Due to this, accurate placement of a read/write head relative to a tape track can be improved. In another implementation, the read element senses recently-written servo stripes which signals the control logic 502 to calculate tape speed. The calculated tape speed is then used to determine when to pulse servo write elements to write a next frame or sub-frame.

Figure 6:
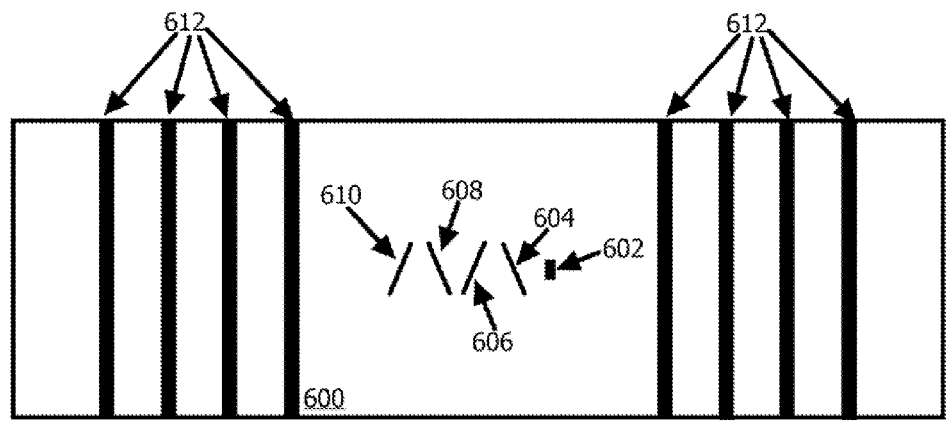
FIG. 6 is an elevation view of a portion of a multi-gap servo write head, in accordance with an example embodiment.

FIG. 6 is an elevation view of a portion of a multi-gap servo write head 600 in accordance with an example embodiment. Multi-gap servo write head 600 includes a read element 602, an A servo write element 604, a B servo write element 606, a C servo write element 608 and a D servo write element 610. Each of the servo write elements (604, 606, 608, 610) are spatially arranged based on a desired servo format. For example, for the LTO format, the servo write elements 604, 606, 608, 610 are angled such that they are not perpendicular to a tape travel path. Restated, the servo write elements (604, 606, 608, 610) are disposed at angles relative to a line perpendicular to the centerline 32 (see FIG. 3) of a servo track. Of course, the orientation of the servo write elements may vary depending on the servo signal format to be written. In addition, similar to multi-gap servo write head 400, multi-gap servo write head 500 includes cross-slots 612.

Figure 7A:
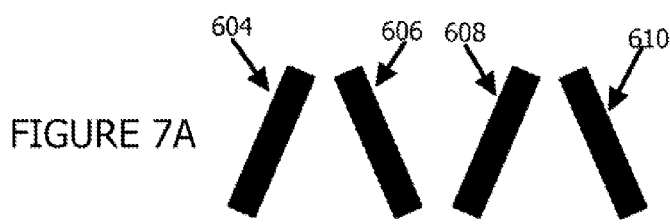
FIGS. 7A-7N illustrate a sequential example of writing a typical servo pattern onto a tape using the multi-gap servo write head of FIG. 6, in accordance with an example embodiment.
Figure 7B:
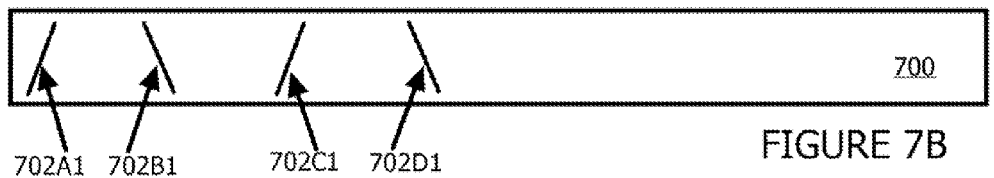
Figure 7C:
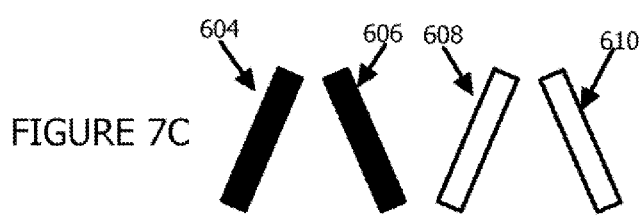
Figure 7D:
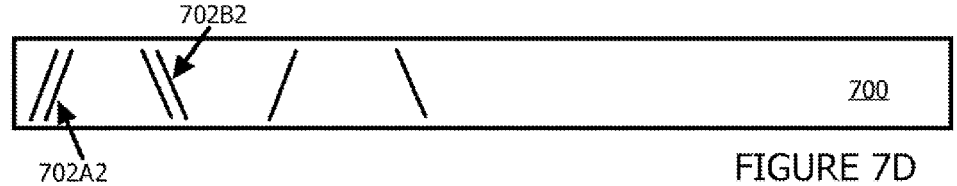

A grouping of A and B servo write elements (604, 606) and C and D servo write elements (608, 610) can each be energized by a pulse generator (not shown) separately from each other or all together. A sequential example of writing a frame of a servo track using multi-gap servo write head 600 is shown via FIGS. 7A-7N. The servo write elements (604, 606, 608, 610) of FIGS. 7A-7N are depicted from a vantage point of the multi-gap servo write head 600. Restated, the servo write elements (604, 606, 608, 610) shown looking from the face of the multi-gap servo write head 600 outward to a moving tape 700. Detection of a trigger stripe of the previously written servo frame initiates operation of the pulse generator to selectively energize the servo write elements to create a servo frame according to a desired format. Selection of a write element that writes the trigger stripe depends on placement of write elements in relation to the read element. In one implementation, the B1 stripe is the trigger stripe. The trigger stripe, however, can be varied and depends on the location of the servo read element relative to the servo write elements and the timing of the servo signals.

The timing of pulses generated by pulse generator depends on the speed of the tape and the desired servo format. Each pair of figures, for example FIGS. 7A and 7B, illustrate the servo write elements (602, 604, 606, 608) and resulting servo stripes on a tape 700. Darkened servo write elements indicate energized servo write elements while non-darkened servo write elements indicate non-energized servo write elements. Additionally, each successive illustration of tape 700 includes servo stripes written from preceding figures. However, for purposes of clarity, only those newly-written servo stripes are labeled for each successive pairing of figures.

Referring to FIGS. 7A and 7B, A, B, C and D servo write elements (604, 606, 608, 610) are all energized and servo stripes 702A1, 702B1, 702C1 and 702D1 are written to the moving tape 700. Next, in FIGS. 7C and 7D, A and B servo write elements (604, 606) are energized and servo stripes 702A2 and 702B2 are written to the moving tape 700. These two servo stripes (702A2, 702B2) are written by themselves in order to allow for LPOS information to be included. Specifically, servo stripes 702A2 and 702B2 are written 0.25 microns early in order to write a ONE. If a ZERO is to be written, servo stripes 702A2 and 702B2 would be written after servo stripes 702C2 and 702D2 of FIG. 7F. For purposes of clarity, it bears repeating that the nominal spacing between stripes within a burst, for example an A burst, is 5 microns.

Figure 7E:
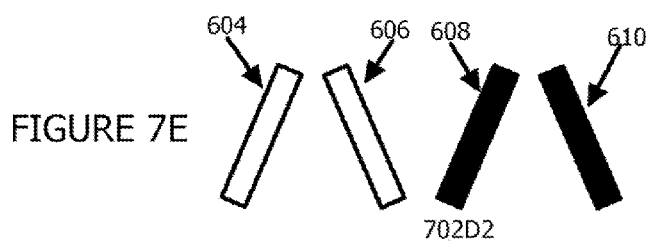
Figure 7F:
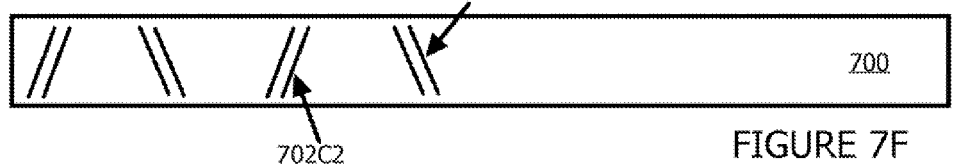
Figure 7G:
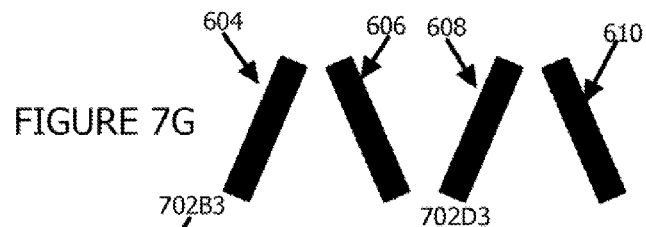
Figure 7H:
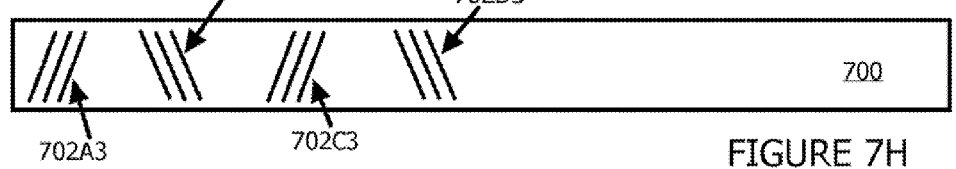

In the next set of figures, FIGS. 7E and 7F, servo write elements 608 and 610 are energized and servo stripes 702C2 and 702D2 are written to the moving tape 700. In turn, all four servo write elements (604, 606, 610, 612) are energized in FIG. 7G and servo stripes 702A3, 702B3, 702C3 and 702D3 are written to the moving tape 700 of FIG. 7H.

Figure 7I:
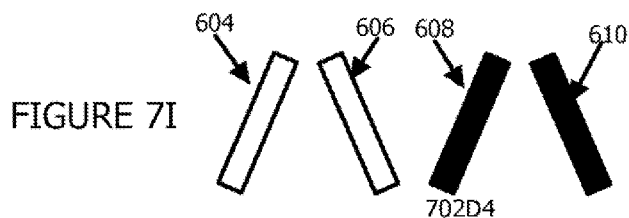
Figure 7J:
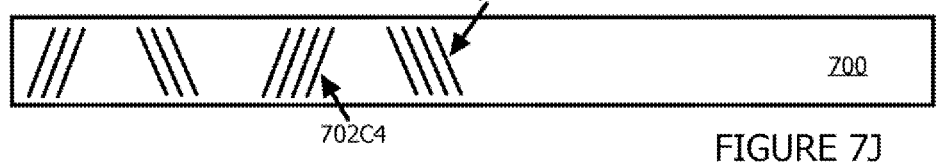
Figure 7K:
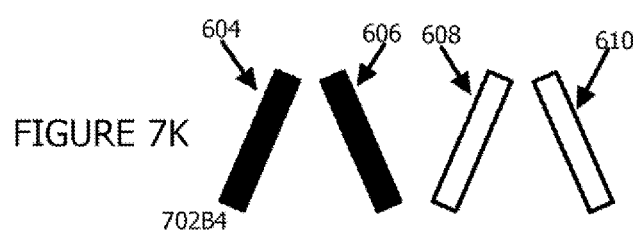
Figure 7L:
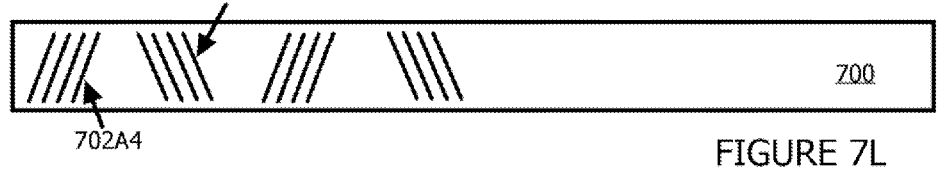
Figure 7M:
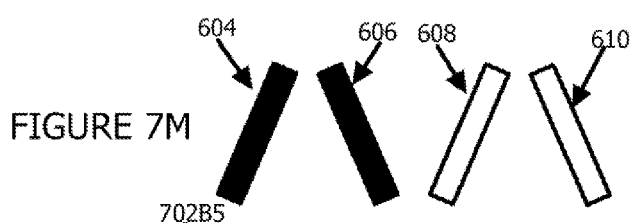
Figure 7N:

In FIGS. 7I, C and D servo write elements 608 and 610 are energized and servo stripes 702C4 and 702D4 are written to moving tape 700 of FIG. 7J. Next, A and B servo write elements 604 and 606 are energized and servo stripes 702A4 and 702B4 are written to the moving tape 700, as shown in FIGS. 7K and 7L. Since a ONE is being encoded into the current frame, the servo stripes 702A4 and 702B4 are written 0.25 microns late and servo stripes 702C4 and 702C4 are therefore written before servo stripes 702A4 and 702B4. If a ZERO is being written, servo stripes 702A4 and 702B4 would be written before servo stripes 702C4 and 702D4. To complete the frame, A and B servo write elements 604 and 606 are energized to write servo stripes 702A5 and 702B5 in FIGS. 7M and 7N. Once servo stripe 702B1 is detected by read element 602, a next frame is then initiated by control logic 502.

Figure 8:
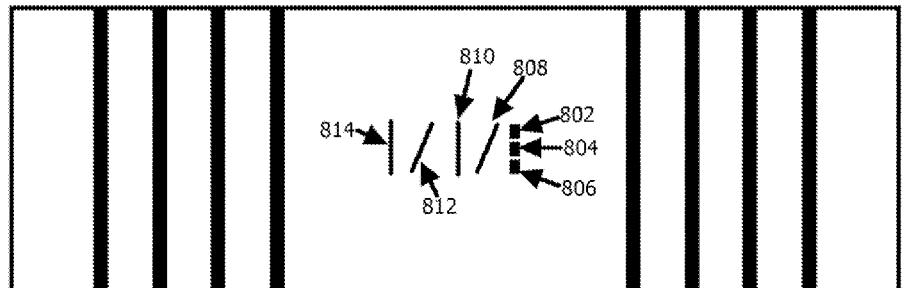
FIG. 8 is an elevation view of a portion of another multi-gap servo write head, in accordance with an example embodiment.

Several other example embodiments will now be described starting with FIG. 8 which is an elevation view of a portion of another multi-gap servo write head 800 that writes a non-LTO servo format. Multi-gap servo write head 800 includes multiple read elements 802, 804 and 806 and A, B, C and D servo write elements (808, 810, 812 and 814). Similar to B and D servo stripes produced on a tape by the head 600 of FIG. 6, B and D servo stripes produced by the head 800 can be used to measure tape speed. As can be seen, the B and D servo write elements (810, 814) are not angled. This quality allows for resulting B and D servo stripes to measure tape speed with better accuracy when there is lateral tape motion since they are not angled and will typically not be affected by the lateral tape motion. Additionally, the multiple read elements (802, 804, 806) allow for more precise detection of written servo stripes and therefore subsequent frames are written/placed with enhanced precision.

Figure 9:
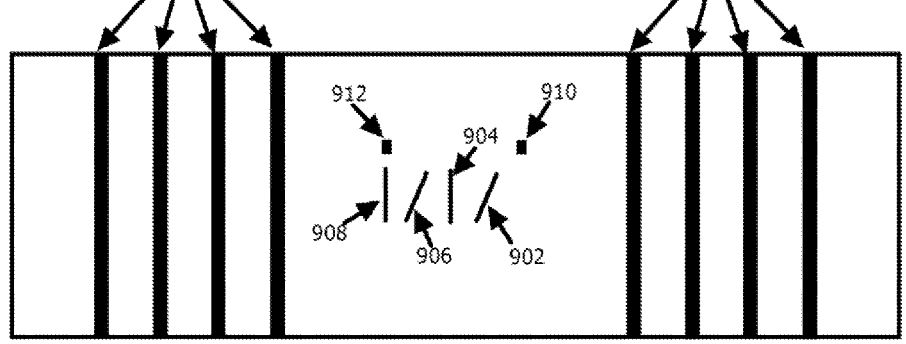
FIG. 9 is an elevation view of a portion of yet another multi-gap servo write head, in accordance with an example embodiment.

FIG. 9 is an elevation view of a portion of yet another multi-gap servo write head 900, in accordance with an example embodiment. Multi-gap servo write head 900 includes servo write elements (902, 904, 906, 908) that have a similar arrangement to that of the multi-gap servo write head 800 of FIG. 8. Multi-gap servo write head 900 further includes a read element 910 and a write element 912. In this configuration, the write element 912 writes above a resulting servo frame and read element 910 transduces marks, written by the write element 912, which are used to signal to control logic 502 to initiate a next frame, or sub-frame, by pulse generator 504.

Frames of a servo pattern can be written to a tape using multi-gap servo write heads 800 and 900 in a manner similar to that of FIGS. 7A-7N.

Figure 10:
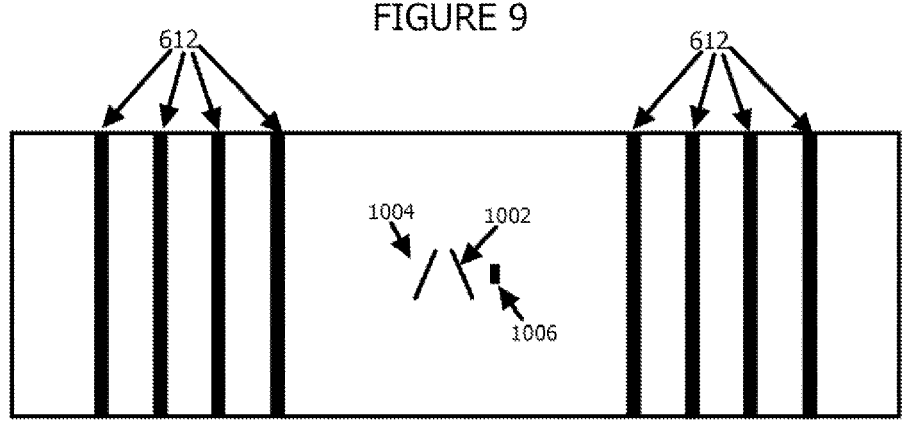
FIG. 10 is an elevation view of a portion of an additional multi-gap servo write head, in accordance with an example embodiment.

FIG. 10 is an elevation view of a portion of an additional multi-gap servo write head 1000, in accordance with an example embodiment. Multi-gap servo write head 1000 is similar to multi-gap servo write head 600 of FIG. 6 except that only two servo write elements (1002, 1004) are included to write servo stripes. Specifically, servo write element 1002 writes A and C bursts while servo write element 1004 writes B and D bursts. Written servo stripes of the bursts are transduced by read element 1006 which signals to control logic 502 (not shown) to start a next frame or sub-frame, in one implementation. Detection of an A1 or a B1 stripe, of a previously-written sub-frame, triggers start of writing of a next sub-frame, in one implementation. Detection of a C1 or a D1 stripe, of a previously-written frame, triggers start of writing of a next frame, in one implementation.

Frames of a servo pattern can be written to a tape using multi-gap servo write heads 1000 in the following manner utilizing detection of a previous sub-frame. First, read element 1006 detects a servo stripe of a previous sub-frame and control logic 502 signals pulse generator 504 to pulse a next sub-frame. In the context of writing a ONE, servo write elements 1002 and 1004 are energized 5 times in a row with the second energization timed slightly early and the fourth energization timed slightly late as compared to the others in order to write A2 and B2 stripes 0.25 microns early and the A4 and B4 stripes 0.25 microns shifted to the right. Next, servo write elements 1002 and 1004 are energized four more times to write C and D bursts. If a ZERO is to be written, the A2 and B2 servo stripes are shifted 0.25 microns to the right and the A4 and B4 servo stripes are shifted to the left by 0.25 microns.

Figure 11:
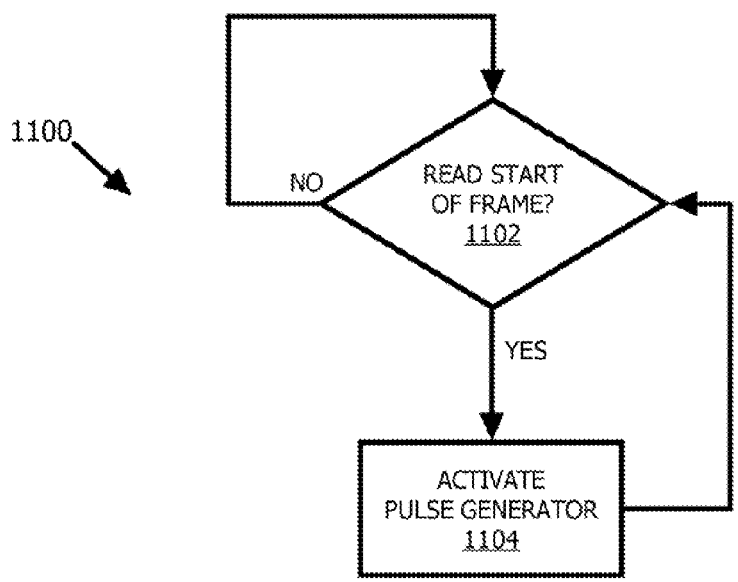
FIG. 11 is a flowchart diagram illustrating a method for activating a pulse generator to write a frame based on detection of a previously written frame, in accordance with an example embodiment.

To further illustrate the functioning of the pulse generator 504, FIG. 11 is a flowchart diagram illustrating a method 1100 for activating a pulse generator 504 to write a frame based on detection of a previously written frame, in accordance with an example embodiment. First, a read element, such as the read elements of FIGS. 6 and 8-10, waits for a start of a frame to start reading (1102). Reading of the start of the frame in turn signals the control logic 502 to start the pulse generator (1104) to pulse a next frame. The process then repeats when the read element reads the next frame.

Figure 12:
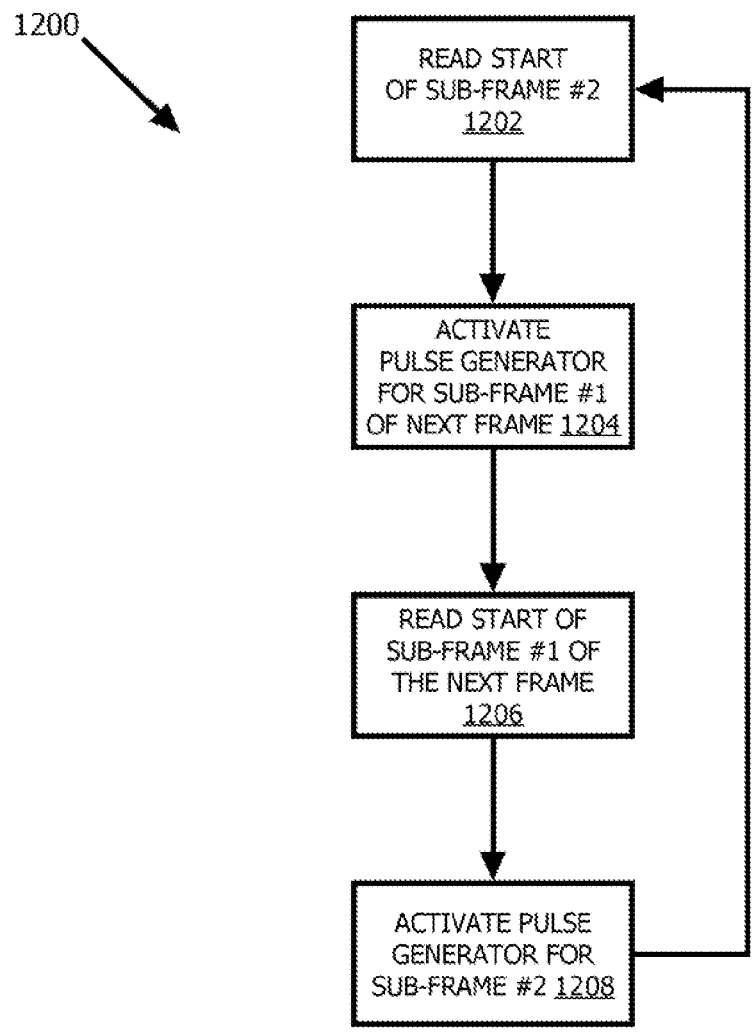
FIG. 12 is a flowchart diagram illustrating a method for activating a pulse generator to write a subframe based on detection of a previously written sub-frame, in accordance with an example embodiment.

Turning to the context of sub-frame detection, FIG. 12A is a flowchart diagram illustrating a method 1200 for activating a pulse generator 504 to write a sub-frame based on detection of a previously written sub-frame, in accordance with an example embodiment. Method 1200 starts in the context of firstly reading, by a read element, a sub-frame #2 of C and D bursts (1202) of a firstly-written frame of a servo track. This signals to control logic 502 to activate the pulse generator 504 to write a next sub-frame #1 of A and B bursts (1204). Next, sub-frame #1 is read by a read element (1206) which signals the control logic 502 to activate the pulse generator 504 to write the next sub-frame #2. The process then repeats.

Figure 13:
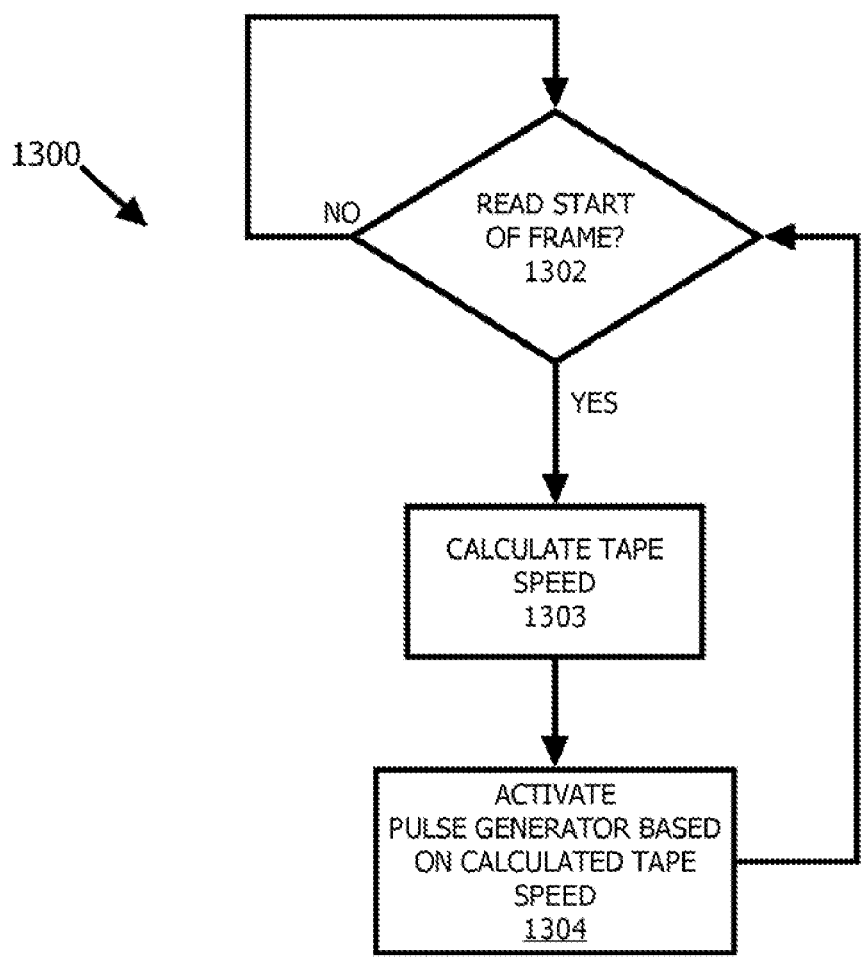
FIG. 13 is a flowchart diagram illustrating another method for activating a pulse generator to write a frame based on detection of a previously written frame and calculated tape speed, in accordance with an example embodiment.

The claimed embodiments further provide for control logic 502 using detection of contemporaneously stamped servo stripes, measuring an amount of time that elapses between detections of those detected servo stripes and calculating tape speed based on the elapsed time and an expected distance between the detected servo stripes. Control logic 502 then uses the calculated tape speed to determine when to signal the pulse generator 504 to write the next frame or sub-frame. Referring to FIG. 13, method 1300 involves a read element, such as the read elements of FIGS. 6 and 8-10, waiting for a start of a frame to start reading (1302). Reading of the start of the frame in turn signals the control logic 502 to calculate tape speed based (1303) on the time difference between two detected servo stripes that were written contemporaneously and an expected distance between those two stripes. Next, control logic 402 signals the pulse generator (1304) to pulse a next frame at a time based on the calculated tape speed. The process then repeats when the read element reads the next frame (1302).

Figure 14:
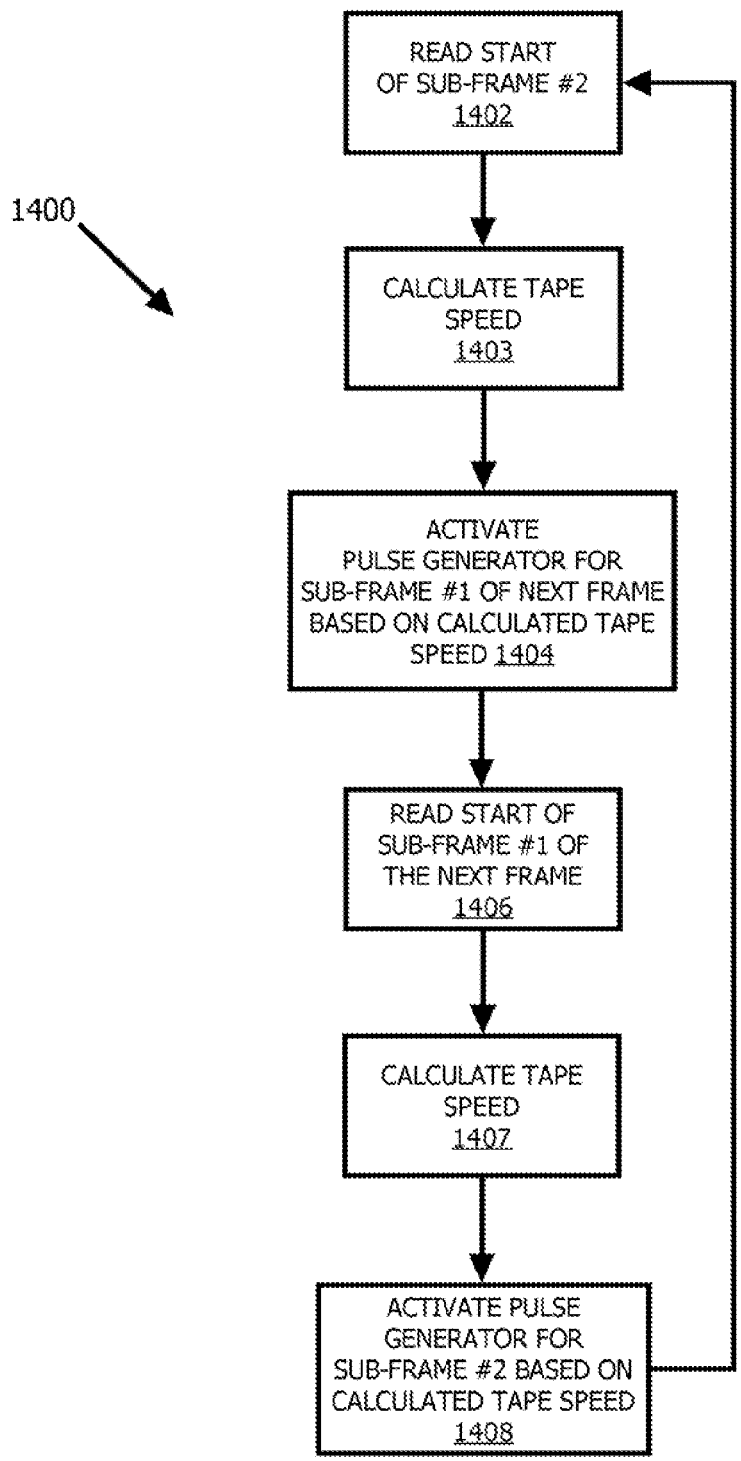
FIG. 14 is a flowchart diagram illustrating another method for activating a pulse generator to write a sub-frame based on detection of a previously written sub-frame and calculated tape speed, in accordance with an example embodiment.

Activating a pulse generator to write a sub-frame based on detection of a previously written sub-frame and calculated tape speed is illustrated via FIG. 14. Method 1400 starts in the context of firstly reading, by a read element, a sub-frame #2 of C and D bursts (1402) of a firstly-written frame of a servo track. This signals to control logic 502 to determine tape speed (1403) and activate the pulse generator 504 to write a next sub-frame #1 of A and B bursts (1404) based on the calculated tape speed. Next, sub-frame #1 is read by a read element (1406) which signals the control logic 502 to determine the tape speed (1407) and activate the pulse generator 504 to write the next sub-frame #2 (1408). The process then repeats.

Referring back to FIG. 3 of the detailed schematic depiction of a PES format of pre-recorded servo stripes on a preformatted tape, PES is typically calculated using the AB to AC and CD to CA ratios. Due to the improvements of the claimed embodiments, error in the CA and AC distances are greatly reduced. Due to this, accuracy of a PES signal is improved. In one implementation, a BC (distance from B burst to C burst) is also utilized for a PES signal calculation.

The claimed embodiments enjoy a number of advantages over the prior art such as reduction of error in the spacing of subframes and the spacing of frames. This is accomplished, in some implementations, by placing a read element on a multi-gap servo-write head to read recently-written servo stripes. Detection of the recently-written servo stripes are used as a signal to write a next frame or sub-frame of a frame.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. An apparatus for writing a longitudinal servo track on a magnetic medium comprising:
   a read/write head comprising a plurality of servo write elements configured to write respective servo stripe elements forming successive servo frames on a tape and one or more read elements disposed to transduce one or more servo stripe elements written by the plurality of servo write elements; and
   control logic operative, in response to detection of a trigger element of the one or more servo stripe elements previously written by at least one of the plurality of servo write elements on the tape, to selectively energize, pursuant to a timed sequence, one or more of the plurality of servo write elements to create a servo frame on the tape.

2. The apparatus as recited in claim 1 wherein the one or more read elements are disposed relative to the trigger element of the one or more servo write elements to enable detection of the trigger element in a written servo frame.

3. The apparatus as recited in claim 1 wherein the control logic is further operative to determine tape speed based on detection of two or more previously written servo stripe elements, the determined tape speed used to control the timed pulses to selectively energize one or more of the plurality of servo write elements to create a servo frame on the tape.

4. The apparatus as recited in claim 1 wherein the one or more previously written servo stripe elements are from an immediately preceding frame.

5. The apparatus as recited in claim 1 wherein the one or more previously written servo stripe elements are from the frame currently being written.

6. The apparatus as recited in claim 5 wherein the one or more previously written servo stripe elements are from a preceding sub-frame.

7. The apparatus as recited in claim 1 wherein the one or more previously written servo stripe elements are from an immediately preceding sub-frame.

8. The apparatus as recited in claim 1 wherein the plurality of servo write elements is at least one pair of servo write elements having non-parallel gaps wherein at least one servo write element of each pair of the at least one pair of servo write elements is not perpendicular to a tape travel path.

9. The apparatus as recited in claim 8 wherein the at least one pair of servo write elements is first and second pairs of servo write elements.

10. The apparatus as recited in claim 9 wherein both servo write elements of the first pair of servo write elements and both servo write elements of the second pair of servo write elements are not perpendicular to the tape travel path.

11. The apparatus as recited in claim 9 wherein the servo write elements of the first pair of servo write elements and the servo write elements of the second pair of servo write elements are not parallel to each other.

12. The apparatus as recited in claim 9 wherein one of the servo write elements of the first pair of servo write elements and one of the servo write elements of the second pair of servo write elements are perpendicular to the tape travel path.

13. The apparatus as recited in claim 12 wherein the one or more read elements is at least two read elements arranged perpendicular to the tape travel path.

14. The apparatus as recited in claim 1 further comprising one or more non-servo write elements configured to write signals wherein at least one read element of the one or more read elements are arranged to transduce the written signals, and wherein the control logic is operative to selectively energize, in response to detection of the written signals, the plurality of servo write elements to create the servo frame on the tape.

15. An apparatus for writing a longitudinal servo track on a magnetic medium comprising:
    a read/write head comprising a plurality of servo write elements configured to write respective servo stripe elements forming successive frames on a tape and one or more read elements disposed to transduce one or more servo stripe elements written by the plurality of servo write elements;
    a pulse generator operative to selectively provide electrical signals to the servo write elements, according to a timed sequence, to write a frame; and
    control logic operative to control operation of the pulse generator in response to detection of a trigger element of the one or more servo stripe elements previously written by at least one of the plurality of servo write elements to create a servo frame on the tape.

16. The apparatus as recited in claim 15 wherein the one or more read elements are disposed relative to the trigger element of the one or more servo write elements to enable detection of the trigger element in a written servo frame.

17. The apparatus as recited in claim 15 wherein the control logic is further operative to determine tape speed based on detection of two or more previously written servo stripe elements, the determined tape speed used to control the timed sequence to selectively energize one or more of the plurality of servo write elements to create a servo frame on the tape.

18. The apparatus as recited in claim 15 wherein the one or more previously written servo stripe elements are from an immediately preceding frame.

19. The apparatus as recited in claim 15 wherein the one or more previously written servo stripe elements are from the frame currently being written.

20. The apparatus as recited in claim 15 wherein the one or more previously written servo stripe elements are from an immediately preceding sub frame and wherein the pulse generator is operative to selectively provide electrical signals to the plurality of servo write elements, according to the timed sequence, to write a sub-frame.

21. The apparatus as recited in claim 15 wherein the plurality of servo write elements is at least one pair of servo write elements having non-parallel gaps wherein at least one servo write element of each pair of the at least one pair of servo write elements is not perpendicular to a tape travel path.

22. The apparatus as recited in claim 21 wherein the at least one pair of servo write elements is first and second pairs of servo write elements.

23. The apparatus as recited in claim 22 wherein both servo write elements of the first pair of servo write elements and both servo write elements of the second pair of servo write elements are not perpendicular to the tape travel path.

24. The apparatus as recited in claim 23 wherein the servo write elements of the first pair of servo write elements and the servo write elements of the second pair of servo write elements are not parallel to each other.

25. The apparatus as recited in claim 22 wherein one of the servo write elements of the first pair of servo write elements and one of the servo write elements of the second pair of servo write elements are parallel to a longitudinal straight line arranged across a width of the servo frame.

26. The apparatus as recited in claim 24 wherein the one or more read elements is at least two read elements arranged perpendicular to the tape travel path.

27. The apparatus as recited in claim 15 further comprising one or more non-servo write elements configured to write signals wherein at least one read element of the one or more read elements are arranged to transduce the written signals, and wherein the control logic is operative to control operation of the pulse generator in response to detection of the write signals previously written by at least one of the one or more non-servo write elements to create a servo frame on the tape.

28. An apparatus for writing a longitudinal servo track on a magnetic medium comprising:
    a read/write head comprising first and second pairs of servo write elements configured to write respective servo stripe elements forming successive frames on a tape and one or more read elements disposed to transduce one or more servo stripe elements written by at least one servo write element of the first and second pairs of servo write elements;
    control logic operative, in response to detection of a trigger element of the one or more servo stripe elements previously written by the at least one servo write element of the first and second pairs of servo write elements on the tape, to selectively energize, according to a timed sequence, one or more servo write elements of the first and second pairs of servo write elements to create a servo frame on the tape;
    wherein the previously written servo stripe elements are from an immediately preceding frame; and
    wherein both servo write elements of the first pair of servo write elements and both servo write elements of the second pair of servo write elements are continuously longitudinally variable in relation to a width of the servo frame.

* * * * *